United States Patent [19]

Kimura et al.

[11] 3,891,320

[45] June 24, 1975

[54] LIGHT INTERFERENCE GAUGE AND FLATNESS TESTER

[75] Inventors: Yoshiaki Kimura; Masanori Kawai; Tatsuo Yajima; Taneji Morishita, all of Tokyo, Japan

[73] Assignee: Konishiroku Photo Industry Co., Ltd., Tokyo, Japan

[22] Filed: Nov. 19, 1973

[21] Appl. No.: 417,204

[30] Foreign Application Priority Data

Mar. 31, 1973  Japan .............................. 48-36176

[52] U.S. Cl. ............................... 356/109; 356/110
[51] Int. Cl. ............................................... G01b 9/02
[58] Field of Search ............ 356/108, 109, 110, 112

[56] References Cited
UNITED STATES PATENTS

| | | | |
|---|---|---|---|
| 3,065,663 | 11/1962 | Donnelly et al. | 356/109 |
| 3,348,446 | 10/1967 | Young | 356/108 |
| 3,436,159 | 4/1969 | Harrick et al. | 356/112 |
| 3,697,182 | 10/1972 | Erickson et al. | 356/112 |
| 3,749,492 | 7/1973 | Kowalski | 356/109 X |

*Primary Examiner*—Archie R. Borchelt
*Attorney, Agent, or Firm*—Stevens, Davis, Miller & Mosher

[57] ABSTRACT

A gauge for measuring flatness by utilizing the interference of light is composed of a block having a reference or standard surface of a high flatness and surfaces intersecting the reference surface. Three supporting members are fixedly secured to said surfaces in an appropriate arrangement. Each of three pins which is anchored to respective supporting member has a pointed top portion jut beyond the reference surface. The object or specimen to be tested is rested on said top portions of the three pins to support the specimen with the tested surface extending substantially in parallel with said reference surfaces in opposing position.

9 Claims, 11 Drawing Figures

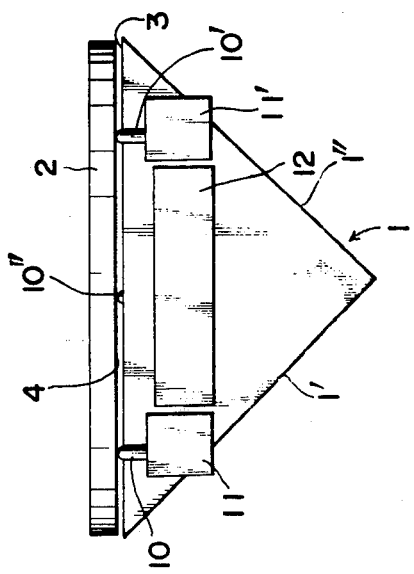
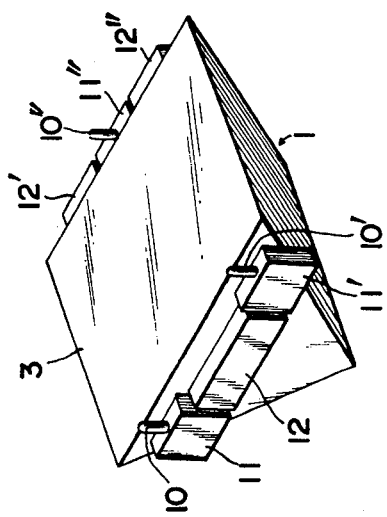
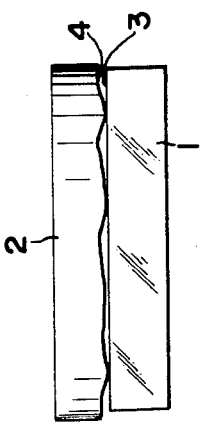
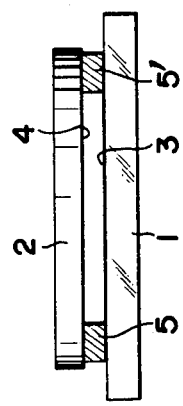
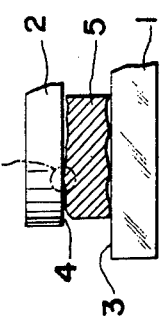

3,891,320

LIGHT INTERFERENCE GAUGE AND FLATNESS TESTER

BACKGROUND OF THE INVENTION

The present invention relates to a light interference guage and an apparatus for testing the surface flatness of an object by using such standard measuring instrument.

It has long been known that the flatness or evenness of a surface of an object can be precisely measured by utilizing the interference of light. The instruments used for such measurement are usually called an interference gauge the typical one of which is the optical flat.

Briefly stated, the optical flat comprises, as schematically illustrated in FIG. 1, a flat plate 1 having a standard surface 3 of an extremely high flatness. An object 2, the surface flatness of which is to be measured or tested, is rested on the standard surface 3 of the plate 1. For flatness measurements made by this type of the optical flat, the surface to be tested is disposed in contact with the standard surface of the gauge, as a result of which there arise various problems or disadvantages as follows:

1. There is a possibility that the standard surface as well as the surface to be tested may be injured;
2. Possible adhesion of dust or the like on the surfaces may adversely affect the precise measurement;
3. Because the contacting points between the standard surface and that of the tested specimen can not be accurately located, the relative positions between those surfaces cannot definitely be determined.

In an effort to overcome the above drawbacks, it has already been proposed to rest the specimen or object to be tested on the plate 1 of the optical flat in an indirect manner with separate spacers 5 and 5' being interposed therebetween, as shown in FIG. 2. For the measurement with this type of gauge, spacers each having the same exact height are indispensable. This involves difficulty, however, in the selection of such spacers. In reality, when observed on the relative basis of a scale of micron order, the supporting top surface of the individual spacer is uneven as seen in FIG. 3. Thus, it is extremely difficult in practice to position the supporting surfaces for the specimen at the same level. For example, in order to position the supporting surfaces of the spacers at the same level or exactly flush with one another, it is necessary to finish the surface of each spacer to a very high degree of flatness by polishing. Additionally it is necessary to make the thickness of the spacers identical with one another. These machining operation of course, require extremely high skill and the spacers thus manufactured will consequently be very expensive. Moreover, they are inconvenient to use, since a high degree of care must be taken in handling the high precision members so as to protect them from being injured. Even if the desired spacers could be obtained and positioned in the required manner, dusts or fine particles between the spacers and the reference surface would inevitably disturb the measuring accuracy.

SUMMARY OF THE INVENTION

An object of the present invention is, therefore, to eliminate the drawbacks of the conventional interference gauge as elucidated above.

Another object of this invention is to provide a flatness testing apparatus which makes use of a novel interference gauge and is simple in construction, convenient in use and inexpensive.

In accordance with the present invention, a gauge for measuring flatness by utilizing the interference of light is composed of a block having a reference or standard surface of a high flatness and surfaces intersecting the reference surface. Three supporting members are fixedly secured to said surfaces in an appropriate arrangement. Each of three pins which is anchored to respective supporting members has a pointed top portion projecting beyond the reference surface. The object or specimen to be tested is rested on the top portions of the three pins to support the specimen with the tested surface extending substantially in parallel with and opposite to the reference surfaces.

The other objects, advantages and novel features of the invention will become apparent from the detailed description with reference to preferred embodiment of the invention described with reference to the drawings in which:

BRIEF DESCRIPTION OF DRAWINGS

FIG. 1 is a side view of a conventional flatness testing apparatus employing an optical flat;

FIG. 2 is a similar view to FIG. 1 but showing another example of a hitherto known flatness tester;

FIG. 3 is a partial, enlarged view of FIG. 2;

FIG. 4 is a perspective view of an embodiment of a flatness testing gauge according to the present invention;

FIG. 5 is a side view of the gauge shown in FIG. 4;

DETAILED DESCRIPTION OF PREFERRED EMBODIMENTS

Figure 8:
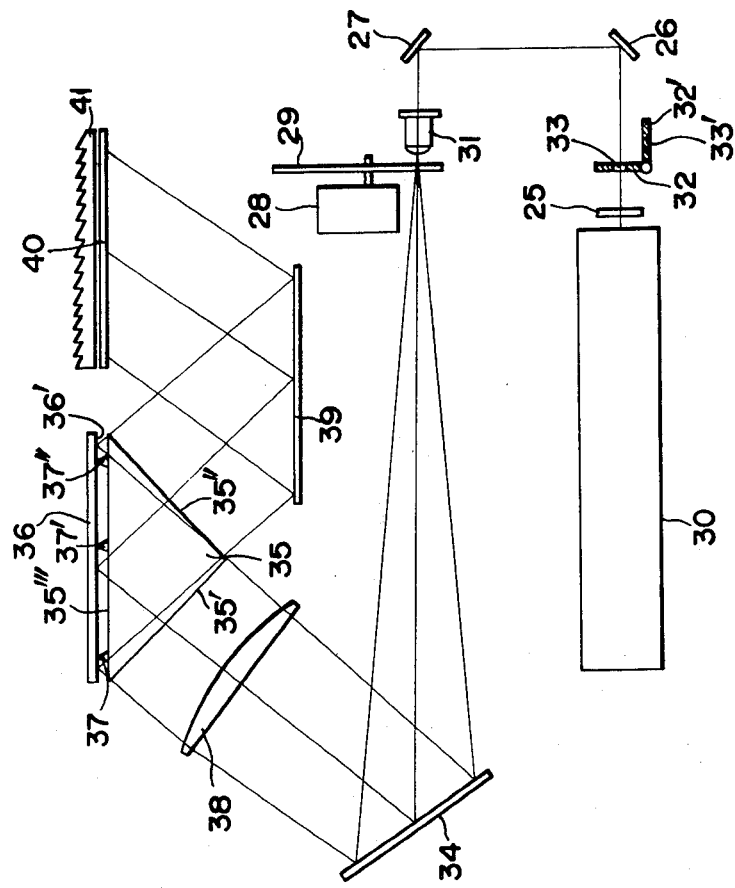
FIG. 8 schematically shows an arrangement of a flatness testing apparatus employing a gauge according to this invention.

Referring to FIGS. 4 and 5, reference numeral 1 indicates an optical prism of a triangular pole configuration which constitutes an essential component of the interference gauge according to this invention and has a reference flat surface 3. Pins 10, 10' and 10'' are secured to the prism 1 at the opposite sides thereof by means of supporting members 11, 11' and 11''. It is to be noted that the top points of the pins 10, 10' and 10'' are positioned so as to project upwardly beyond the plane of the reference surface 3 about 5/100 mm and thus be of the same height relative to the surfaces. Because the top portions of the pins 10, 10' and 10'' are pointed, flatness of the supporting portions is not required. The height or vertical level of the pointed tops of pins can be easily adjusted. Reference numerals 12, 12' and 12'' denote mounting members which are fixed to the side surfaces of the prism 1 and serve to mount the prism 1 to an instrument such as a flatness tester apparatus as will hereinafter be described. The supporting members 11, 11' and 11'' as well as the mounting members 12, 12' and 12'' should preferably be made of the same material as that of the prism 1 or a material having a coefficient of expansion substantially equal to that of prism 1.

FIG. 5 shows the gauge of FIG. 4 in the measuring or testing state. Reference numeral 2 indicates an object or specimen having a surface 4 the flatness of which is to be measured. As can be seen from the drawing, the surface 4 of the specimen 2 is supported on the pointed top ends of the fixed pins 10, 10' and 10'' anchored to the supporting members 11, 11' and 11'' with a constant distance from the reference surface 3 of the prism 1. The light beam is projected to the incidence surface 1' of the prism 1. By observing the interference pattern of the light coming from the emitting surface 1'', the condition of unevenness or the flatness of the tested surface 4 can be inspected.

Figure 6:
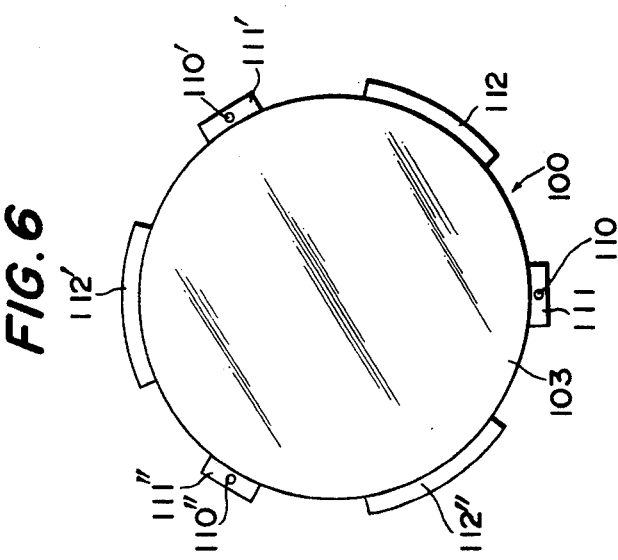
FIG. 6 is a plan view of another embodiment of the flatness testing gauge according to this invention.
Figure 7:
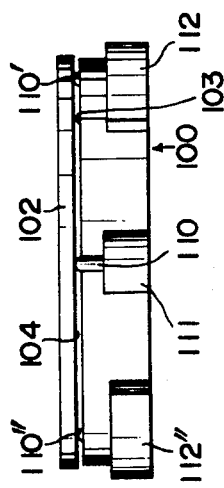
FIG. 7 is a side view of FIG. 6.

FIGS. 6 and 7 show another embodiment of this invention. Reference numeral 100 represents a cylindrical solid glass block, e.g., gauge having a standard or reference surface 103 of an extremely high flatness. Pins 110, 110' and 110'' are fixedly anchored to respective supporting members 111, 111' and 111'' which in turn are securely bonded to the outer surface of the glass block 100 around the periphery thereof. Holding members 112, 112' and 112'' are alternately spaced between the pins with equal angular distances among them.

To make a measurement, a specimen 102 is rested on the pins 110, 110' and 110'' and the gauge is illuminated by light beam from above substantially perpendicular to the reference surface. Then, the interference pattern of the light reflected from the standard surface 103 and the tested surface 104 can be observed, and thus the flatness of the surface 104 may be determined on the basis of the observed interference pattern.

From the foregoing description, it will be understood that the flatness measuring gauge according to the present invention is very rigid in construction and exhibits excellent stability against mechanical shock due to the fact that the gauge is integrally combined with the specimen supporting members and no unstable members such as spacers are required. The dimension of the gap between the reference surface and the tested surface can be variably adjusted in a wide range including zero. Moreover, adhesion of dusts or fine particles would not exert any influence on the measurement precision. The possibility of the gauge and the tested surface being injured may be substantially reduced.

FIG. 8 shows a flatness tester apparatus in which an interference gauge according to the invention is used. In this drawing, reference numeral 30 denotes a light source which may be constituted by a laser. A color filter 25 is disposed at the output side of the light source 30. Reference numerals 26, 27 indicate reflector mirrors and numeral 31 denotes a lens system. Disposed between the color filter 25 and the mirror 26 are light interrupting plates 32, 32' formed with respective apertures 33 and 33'. The latter aperture 33' is provided with a filter. Reference numeral 34 indicates another reflector plate, numeral 38 indicates a collimator lens, numeral 39 denotes a further reflector plate and numeral 40 represents a screen which is disposed below a Fresnel plate.

Reference numeral 35 indicates a prism constituting the interference gauge and having an incidence surface 35', an emitting surface 35'' and a reference surface 35'''. A specimen 36 to be tested is supported above the reference surface 35''' of the prism by means of supporting pins 37, 37' and 37'' arranged in the manner as described with reference to FIGS. 4 to 7. Finally, reference numeral 29 indicates a light diffusion plate which is adapted to be driven by an electric motor 28 to thereby adjust the interference ability of the laser light. The collimated light beam from the lens 38 is applied to the prism 35 and reflected at the tested and the reference surfaces 36' and 35''' to produce interference, the fringes of which are projected onto the screen 40.

The number of the interference fringes appearing on the screen 40 and the distance d between the reference surface 35''' of the prism 35 and the tested surface 36' are related to each other as can be mathmatically expressed as follows;

$$\Delta d = (\lambda/2n_o \cos\phi)$$

wherein $\Delta d$ indicates an increment or decrement of deviation or change in the distance d which produces one fringe, $n_o$ represents refractive index of a medium filling the gap between the reference surface 35''' and the tested surface 36', $\lambda$ denotes wave length of light and $\phi$ is an incidence angle of the light beam to the tested surface 36'.

When the incidence angle $\phi$ is varied in the range of 0° to 90°, the incremental or decremental change $\Delta d$ of the distance d corresponding to a single interference fringe will vary in the range $(\lambda/2n_o) \leq \Delta d < \infty$. Thus, one can in practice determine the deviation from the flatness or the unevenness of the tested surface 36' in the range from a light wave length to ten microns, although the upper limit is theoretically infinite. In this manner, relatively great unevenness of the tested surface can be measured with a high accuracy by projecting the light beam to the surface in a slant direction.

The Fresnel plate 41 is provided for the purpose of facilitating the top observation of the interference pattern projected on the screen 40. If the Fresnel plate 41 was not provided, the primary direction of the light diffused by the screen 40 would lie on the extension of axis of the incidence light beam, and as a result a bright and clear interference pattern could be observed only laterally from above. However, by providing the Fresnel plate 41 which serves to refract the diffused light into the direction substantially parallel to the vertical axis of the tester apparatus, one can observe a bright and clear interference pattern directly from the top of the tester.

As has been described, the relationship between the single fringe of the interference fringes projected on the screen 40 and the corresponding incremental or decremental deviation $\Delta d$ of the distance d between the reference and the tested surfaces can be expressed as follows:

$$\Delta d = (\lambda/2n_o \cos\phi)$$

Accordingly, by varying the incidence angle $\phi$ to the tested or specimen surface, the relation between the interference fringe and the deviation $\Delta d$ can be changed differently. In other words, the measuring sensitivity of the instrument may be varied by changing the incidence angle $\phi$.

For changing the angle $\phi$, two different methods are conceivable. The first method is to vary the direction of the light beam applied to the prism 35. Other method resides in the exchange of prisms having different vertex angles and refractive indexes. The first method requires associated adjustments of lenses, reflection mirrors, screen, etc. In this sense, the first method is impractical. According to the present invention, the second method is therefore employed to vary the measuring sensitivity, which will be described with reference to FIGS. 9 and 10.

Figure 9:
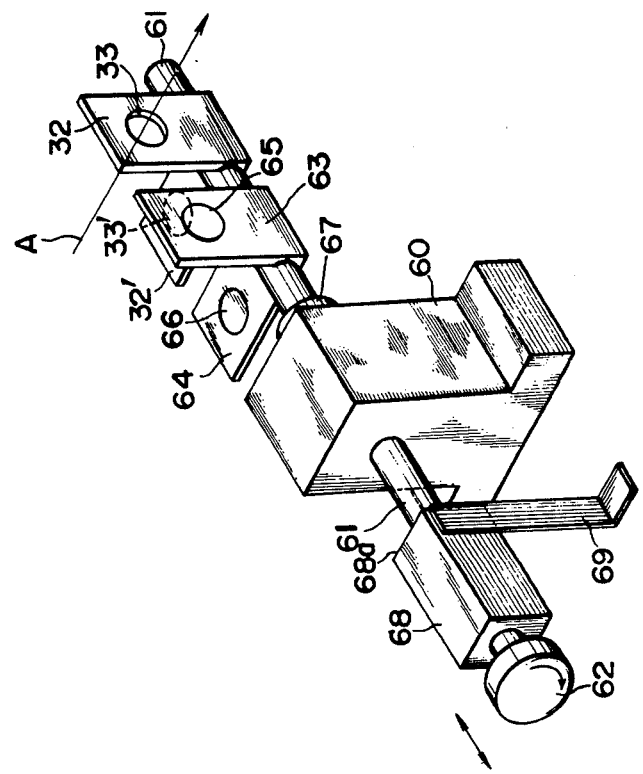
FIG. 9 is a schematic diagram illustrating the effect of prisms having different vertex angles when used as the gauge in the flatness testing apparatus shown in FIG. 8.

In FIG. 9, reference numeral 52 indicates a prism having a reference surface 53 and the incidence surface to which the light beam 51 is impressed. Numeral 50 represents imaginary plane which lies in parallel to the reference surface 53.

Now assuming that the light beam 51 is inclined to the plane 50 with an angle $\alpha$ and the vertex angle of the prism is $\beta_1$ (in case of the prism having the cross-section depicted by the solid line), this light beam 51 will impinge on the incidence surface of the prism at the point $P_1$ and after having been refracted propagate toward the reference surface 53 where the light beam is again subjected to the second reflection and emitted therefrom with an angle $\phi_1'$ relative to the reference surface 53. In case the prism has a vertex angle of $\beta_2$ (the prism depicted in single dot and dash line), the light beam impinging upon the prism at the point $P_2$ will leave the prism with an angle $\phi_2'$ relative to the reference surface 53. In this manner, the angle $\phi'$ with which the light beam 51 is emitted from the reference surface 53 can be arbitrarily varied by exchanging the prisms having different vertex angles, with the angle $\alpha$ held constant. When the angle $\phi'$ is changed, the incidence angle of the light beam to the tested surface will correspondingly vary. The relation between the vertex angle $\beta$ of the prism 52 and the angle $\phi'$ of the light beam 51 emitted from the reference surface 53 can be given by the following mathematical expression;

$$\phi' = 90° - \sin^{-1}[(n_o/n)\{\cos \beta/2 - \sin^{-1}(n_o/n \sin(\alpha - \beta/2))\}]$$

wherein $n$ and $n_o$ represent refractive indexes of the used prism and the ambient medium, respectively. As will be apparent from the above equation, the angle $\phi'$ can also be varied by changing the refractive index $n$ with the vertex angle $\beta$ held constant. In other words, by exchanging the prisms which have the same vertex angle but different reflactive indexes, the angle $\phi'$ of the outgoing light beam 51 relative to the reference surface 53 can be selectively changed.

To place different prisms as mentioned above it would be easy to place the new prism in exactly the same position as that of the removed prism. Further, it would not take a lot of time to exchange prisms. In view of the fact that optical elements such as prisms are finished with a high precision, the measuring sensitivity can be determined exactly and easily.

As hereinbefore described, an advantage of the present invention resides in the feature that the light path from the light source to the prism as well as the succeeding light path remain unchanged even if the prism is replaced by a different one.

Figure 10:
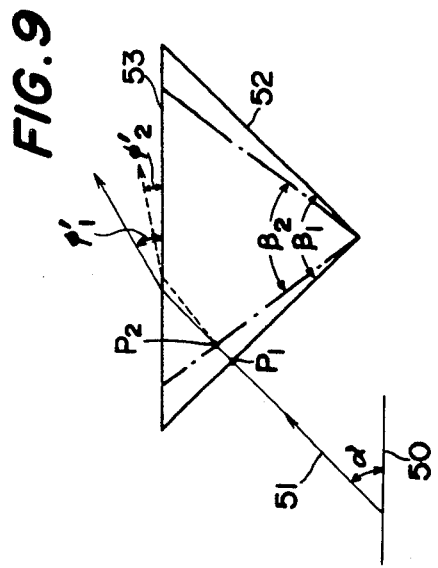
FIG. 10 is a schematic diagram to illustrate the effect of prisms consisting of materials having different refraction indexes.

Referring to FIG. 10 which illustrates the principle of the sensitivity adjustment of the tester by using prisms of different refractive indexes, reference numeral 56 indicates an equilateral triangular prism, numeral 55 denotes an incident light beam to the prism 56, numeral 57 represents the reference surface of the prism 56, numeral 58 indicates a surface to be tested, and reference numerals 59 and 59' represent the incidence points of the light beams 55 on the tested surface 58 as emitted from the prisms having different refractive indexes $n_1$ and $n_2$. Finally, reference numeral 54 indicates an imaginary plane extending in parallel with the reference surface 57.

As can be seen from FIG. 10, when the substance constituting the prism has a refractive index $n_1$, the light beam 55 leaves the reference surface 57 with an angle $\phi_1''$ and after having been reflected by the specimen surface 58 at a point 59 travels again toward the reference surface 57. Because the incidence angle and the reflection angle are equal to each other, the light beam reflected at the point 59 impinges upon the reference surface with the incidence angle $\phi_1''$. Thus, the outgoing light beam from the prism will obviously form the angle $\alpha$ with the imaginary plane 54 at an incidence point $P_{o1}$.

In case the refractive index of the material of prism 56 is $n_2$, the light beam 55 leaves the prism with an angle $\phi_2''$ and intersects the plane 54 with the same angle $\alpha$ at a different point $P_{o2}$. This holds true even when the vertex angle $\beta$ is changed. Because the distance between the reference surface 57 and the tested specimen surface 58 is in practice very small, it may be regarded that the points $P_{o1}$ and $P_{o2}$ in FIG. 10 will substantially superpose on each other. Accordingly, the light path succeeding the prism may be considered to remain substantially unchanged. The clearness of the observed interference fringe is varied as a function of the reflection factors of the reference and the tested surfaces. Therefore, a clear and plain interference fringe can be always produced by selectively using a prism having a reference surface of a suitable reflection factor in correspondence with the reflection factor of the tested surface.

Figure 11:
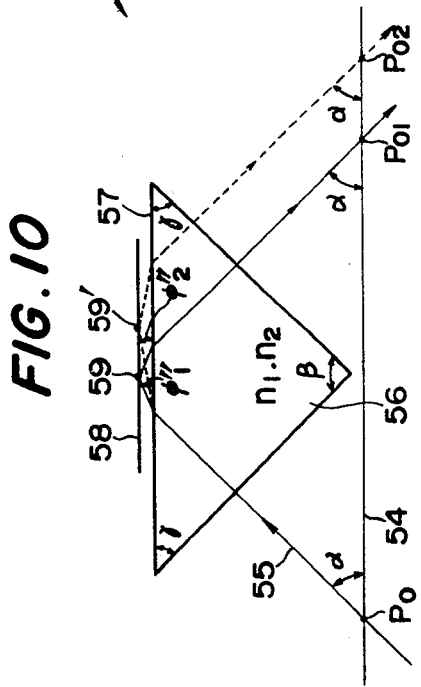
FIG. 11 is a perspective view of a filter exchanging assembly which may be employed in the apparatus shown in FIG. 8.

In one preferred embodiment of the flatness tester according to the present invention, a laser of a relatively high power is employed so that the flatness tester can be used with abundant ambient illumination. This feature in turn brings about a drawback in that the light intensity on the screen would be too high for observation and eye fatigue may occur when the tester is to be used in a dark room. In order to eliminate such an inconvenience, a filter 33' may be inserted in the light path in place of the aperture 33 as is shown in FIG. 11. Referring to FIG. 11, reference numeral 61 indicates a filter manipulating shaft having a knob 62 fixed at one end thereof. The shaft 61 is supported by a supporting member 60 so as to be axially movable and rotatable around the axis thereof and has two pairs of plates 32, 32' and 63, 63' secured thereto with right angle between the plates in each pair. The plate 32 is formed with a through aperture 33, while the plates 32', 63 and 64 are, respectively, provided with filters 33', 65 and 66 having different transmission factors. In the position illustrated in FIG. 11, the aperture 33 lies in the light beam path A. By rotating the shaft 61 clockwise for 90° starting from the illustrated position, the filter 33' may be positioned in the light path A. Moreover, by axially displacing the shaft 61 to the right as viewed in FIG. 11, the filter 65 can be inserted into the light beam path A. When the shaft 61 is then additionally rotated for 90°, the filter 66 is placed in the light beam path A.

While the invention has been described with reference to preferred embodiments illustrated in the drawings, it should be apparent to those skilled in the art that modifications and variations may be made in the form of the invention without departing from the scope and spirit of the invention.

What is claimed is:

1. A light interference gauge comprising:
   a block having a reference surface with a high degree of flatness for receiving light beams projected obliquely thereto, said block having further surfaces intersecting said reference surface;
   three supporting pieces secured to said intersecting surfaces; and
   three pins individually anchored to said supporting pieces, each pin having a top portion which juts beyond said reference surface.

2. Light interference gauge set forth in claim 1, characterized in that said block is a triangular prism having a bottom surface which serves as said reference surface, and that said supporting pieces are fixed to two side surfaces perpendicular to said bottom surface.

3. An apparatus for testing the flatness of an object comprising a triangular prism having a bottom surface providing a reference surface having a high degree of flatness for receiving light beams projected obliquely thereon and having two side surfaces perpendicular to said bottom surface and having two other surfaces intersecting said reference surface and forming a vertex angle of said prism, three supporting pieces and each having a top portion which juts beyond said reference surface, a light source for applying a collimated light beam onto one of the other surfaces which form the vertex angle of said prism, and a screen onto which light beams reflected by said reference surface and emitted from the other of said other surfaces are projected.

4. Apparatus set forth in claim 3, wherein means are provided to allow changing said prism to another prism having a different vertex angle.

5. Apparatus set forth in claim 3, wherein means are provided to allow changing said prism to another prism having a different refraction index.

6. Apparatus set forth in claim 3, wherein means are provided to allow changing said prism to another prism having a different vertex angle and refraction index.

7. Apparatus set forth in claim 3, further comprising light intensity adjusting means including filters which can be selectively inserted in the path of said light beam.

8. Apparatus set forth in claim 3, further comprising a Fresnel plate disposed adjacent to said screen to deflect the direction of a substantial portion of light diffused by said screen.

9. A light interference gauge comprising:
   a block having a reference surface with a high degree of flatness and a plurality of other surfaces which intersect said reference surface to form edges therewith;
   a plurality of supporting pieces attached to said other surfaces near said edges; and
   a plurality of pins attached to said supports for positioning a surface to be measured relative to said reference surface to permit the oblique projection of light onto said reference surface.

* * * * *